(12) United States Patent
Wen et al.

(10) Patent No.: US 11,489,322 B2
(45) Date of Patent: Nov. 1, 2022

(54) LED POWER SUPPLY INTEGRATED JUNCTION BOX

(71) Applicant: ZHUHAI VOFAN TECHNOLOGY CO., LTD, Zhuhai (CN)

(72) Inventors: Guobiao Wen, Meizhou (CN); Chuqiang Tan, Lianzhou (CN)

(73) Assignee: ZHUHAI VOFAN TECHNOLOGY CO., LTD, Zhuhai (CN)

( * ) Notice: Subject to any disclaimer, the term of this patent is extended or adjusted under 35 U.S.C. 154(b) by 135 days.

(21) Appl. No.: 17/156,549

(22) Filed: Jan. 23, 2021

(65) Prior Publication Data
US 2022/0190575 A1 Jun. 16, 2022

(30) Foreign Application Priority Data
Dec. 12, 2020 (CN) .......................... 202011450139.8

(51) Int. Cl.
*H02G 3/08* (2006.01)
*H02G 3/14* (2006.01)

(52) U.S. Cl.
CPC ............... *H02G 3/14* (2013.01); *H02G 3/085* (2013.01)

(58) Field of Classification Search
CPC .......... H02G 3/08; H02G 3/081; H02G 3/085; H02G 3/083; H02G 3/14; H05K 5/00; H05K 5/02; H05K 5/0217; H05K 5/0247; H05K 5/03; H05K 5/04; H01R 13/46; H01R 13/53; H01R 13/533

USPC ....... 174/480, 481, 50, 53, 57, 58, 520, 559, 174/66, 67, 535, 17 R; 220/3.2, 3.3, 241, 220/242; 439/535, 536; 52/220.1, 220.3, 52/220.7
See application file for complete search history.

(56) References Cited

U.S. PATENT DOCUMENTS

| | | | | |
|---|---|---|---|---|
| 1,396,434 | A * | 11/1921 | Horton | H02G 3/14 220/3.8 |
| 3,472,945 | A * | 10/1969 | Trachtenberg | H02G 3/081 174/53 |
| 5,257,487 | A * | 11/1993 | Bantz | H02G 3/12 52/220.1 |
| 6,576,835 | B1 * | 6/2003 | Ford | H02G 3/086 174/50 |
| 7,825,335 | B2 * | 11/2010 | Carbone | H02G 3/18 174/50 |
| 8,759,674 | B2 * | 6/2014 | Korcz | H02G 3/121 174/53 |
| 9,035,175 | B2 * | 5/2015 | Korcz | H02G 3/12 174/50 |

* cited by examiner

*Primary Examiner* — Angel R Estrada
(74) *Attorney, Agent, or Firm* — Jeenam Park

(57) ABSTRACT

Provided is an LED power supply integrated junction box, which includes a main body and a bottom cover. One side of an inner wall of the main body is connected with multiple positioning hollow columns. A partition is fixedly connected to the middle of the main body. Two small circular through holes are defined in one side of the partition. The opposite surfaces of the partition and the inner wall of the main body are each fixedly connected with multiple clamping grooves.

10 Claims, 5 Drawing Sheets

LED POWER SUPPLY INTEGRATED JUNCTION BOX

CROSS-REFERENCE TO RELATED APPLICATIONS

This is a U.S. patent application which claims the priority to and benefit of Chinese patent application number 202011450139.8, filed on Dec. 12, 2020, the disclosure of which is incorporated herein by reference in its entirety.

TECHNICAL FIELD

This disclosure relates to the technical field of junction boxes, and more particularly relates to an LED power supply integrated junction box.

BACKGROUND

In home decoration, the junction box is one of electrical accessories. The wires used for decoration are passed through wire tubes, and the junction box is used as a transition at the joints of the wires. The wire tubes are connected to the junction box, and the wires inside the wire tubes are connected together in the junction box, thus achieving the purposes of protecting and connecting the wires.

Most of the existing LED power supply junction boxes are usually used for the wiring installation of LED control devices or LED power supplies, whose purpose is to meet safety requirements and also bring convenience to the customers. However, among most of the existing junction box products on the current market, some install the LED power supply and the junction box separately, and so do not achieve an integrated installation; some even separate the input and output portions into two parts. Furthermore, most of the junction boxes are not waterproof. Consequently, these approaches will not only cause problems for customers such as installation difficulties, but also increase the cost of subsequent maintenance.

SUMMARY

It is therefore an object of this disclosure to provide an LED power supply integrated junction box. In particular, through a circular groove provided, in the event that water hits the upper cover, the water can be drained through the semi-circular groove without entering the inside of the junction box. When water rushes towards the power supply box from the upper or lower cover, the water will enter the closed screw positioning hollow column inside the main body through the screw mounting holes, and then drain from the screw mounting holes in the upper or lower cover thus achieving waterproof effect. Furthermore, through a movable baffle arranged inside the main body, the sizes of the input and output wiring spaces can be freely changed, which solves the problem of narrow wiring space and improves the practicability of the junction box. In addition, through a positioning frame provided, the positioning frame makes the first upper cover and the second upper cover a movable hinge structure design, making the junction box more flexible and free and convenient for wiring. Further, by arranging two small circular through holes in the main body, control devices can be installed to realize man-machine interaction, thereby improving the applicability of the junction box and solving the above-mentioned problems in the related art. To achieve the above objectives, the present disclosure adopts the following technical solutions.

There is provided an LED power supply integrated Junction box, which includes a main body and a bottom cover.

A plurality of positioning hollow columns are fixedly connected to one side of the inner wall of the main body. A partition is fixedly connected to the middle of the main body. Two small circular through holes are defined in one side of the partition. The opposite surfaces of the partition and the inner wall of the main body are each fixedly connected with a plurality of clamping grooves, and a baffle is slidably fitted between every two adjacent clamping grooves. The upper side of the main body is fixedly connected with a first upper cover.

One side of the first upper cover is installed with a second upper cover. The upper side of each of the first upper cover and the second upper cover is provided with a plurality of third screw mounting holes. One side of the second upper cover is fixedly connected with a positioning frame, and one side of the first upper cover is provided with a first arc-shaped plate adapted to the positioning frame, and the first arc-shaped plate is slidably fitted inside the positioning frame. One side of the bottom cover is provided with a plurality of first screw mounting holes and a plurality of second screw mounting holes.

The peripheral sides of the main body are provided with a plurality of first large circular hollow slots, the upper side of the bottom cover is provided with a second large circular hollow slot, and the joint between the first upper cover and the second upper cover is a sealed semicircular recessed groove.

Optionally, the partition divides the main body into two independent spaces, including an LED power supply installation space and a wiring space, and the clamping grooves are located in the wiring space.

Optionally, a suitable control device is installed in the two small circular through holes for human-computer interaction.

Optionally, the first large circular hollow slots and the second large circular hollow are used for the installation of input and output wire tubes. Depending on the specific situation on the site, any of the hollow slots may be knocked open to fix the wire tubes.

Optionally, the positioning frame includes a second arc-shaped plate, where the upper side of the second arc-shaped plate is fixedly connected with a positioning plate, and the lower side of the positioning plate is fixedly connected with an arc-shaped hook.

Optionally, the first arc-shaped plate and the first arc-shaped plate are rotatably fitted inside the second arc-shaped plate.

Optionally, one side of the main body is provided with a slide groove adapted to the second arc-shaped plate, and the second arc-shaped plate is slidably fitted inside the slide groove.

Optionally, the first upper cover and the second upper cover each have a rectangular plate structure.

Optionally, one side of the positioning hollow column is provided with a threaded groove adapted to the screw.

Optionally, one side of the first upper cover is provided with a groove adapted to the positioning plate.

The embodiments of the present disclosure may provide the following beneficial effects.

According to one embodiment in accordance with the present disclosure, through a circular groove provided, in the event that water hits the upper cover, the water can be drained through the semi-circular groove without entering the inside of the junction box. When water rushes towards the power supply box from the upper or lower cover, the water will enter the closed screw positioning hollow column inside the main body through the screw mounting holes, and then drain from the screw mounting holes in the upper or lower cover thus achieving waterproof effect. Furthermore, through a movable baffle arranged inside the main body, the sizes of the input and output wiring spaces can be freely changed, which solves the problem of narrow wiring space and improves the practicability of the junction box. In addition, through a positioning frame provided, the positioning frame makes the first upper cover and the second upper cover a movable hinge structure design, making the junction box more flexible and free and convenient for wiring. Further, by arranging two small circular through holes in the main body, control devices can be installed to realize man-machine interaction, thereby improving the applicability of the junction box.

Of course, any product practicing the present disclosure does not necessarily need to achieve all the advantages described above at the same time.

BRIEF DESCRIPTION OF DRAWINGS

The drawings accompanying the specification that constitute a part of this application are used to provide a further understanding of the present disclosure, and the exemplary embodiments and descriptions thereof according to the present disclosure are used to explain the present disclosure, and do not constitute an improper limitation to the present disclosure. In the drawings.

Figure 1:
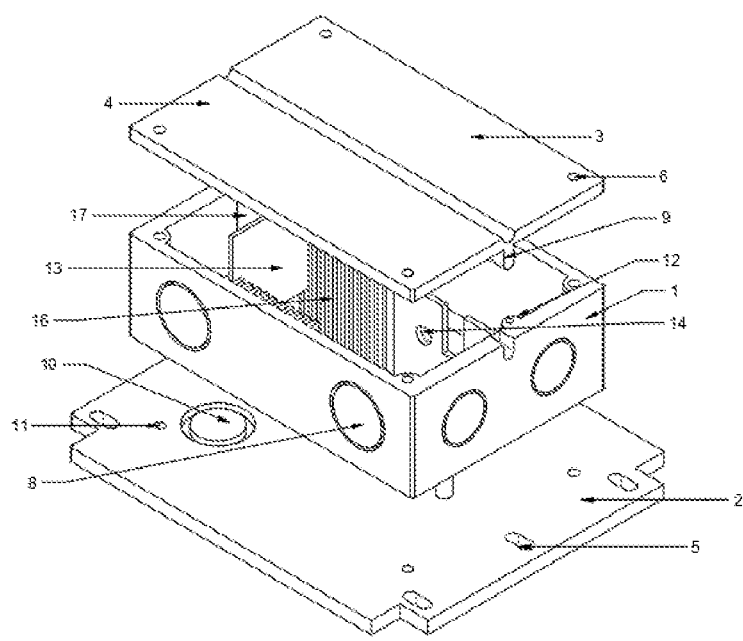
FIG. 1 is a schematic diagram illustrating the three-dimensional structure of the main body according to an embodiment of the present disclosure.

The above drawings include the following reference signs:

Main body 1, bottom cover 2, first upper cover 3, second upper cover 4, second screw mounting hole 5, third screw mounting hole 6, first large circular hollow slot 8, semicircular groove 9, second large circular hollow slot 10, first screw mounting hole 11, screw positioning hollow column 12, baffle 13, small circular through hole 14, rod 16, partition 17, positioning frame 20;

First arc-shaped plate 101, second arc-shaped plate 102, positioning plate 103, arc-shaped hook 104.

DETAILED DESCRIPTION

Hereinafter, technical solutions in the embodiments of the present disclosure will be described in a definite and comprehensive manner in connection with the accompanying drawings in the embodiments of the present disclosure. It is apparent that the embodiments described herein represent merely a part rather than all of the embodiments in accordance with the present disclosure. The following description of at least one exemplary embodiment is actually merely illustrative, and in no way serves as any limitation to the present disclosure and its application or use.

In order to keep the following description of the embodiments of the present disclosure clear and concise, the present disclosure omits detailed descriptions of known functions and known components.

Figure 2:
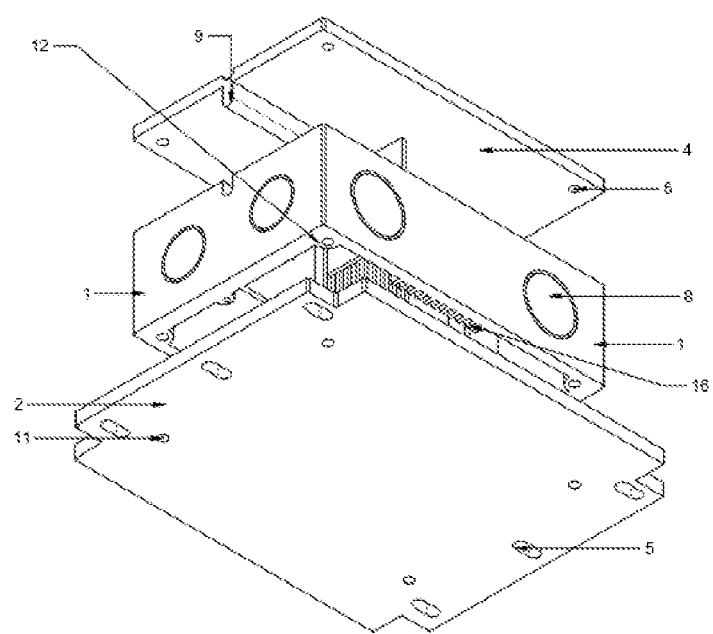
FIG. 2 is a schematic diagram illustrating the three-dimensional structure of a bottom cover according to an embodiment of the present disclosure.
Figure 3:
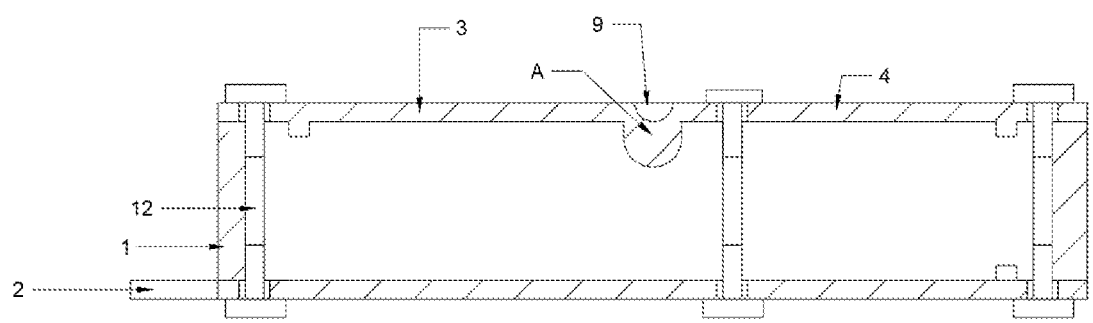
FIG. 3 is a schematic diagram illustrating the cross-sectional structure of a main body according to an embodiment of the present disclosure.
Figure 4:
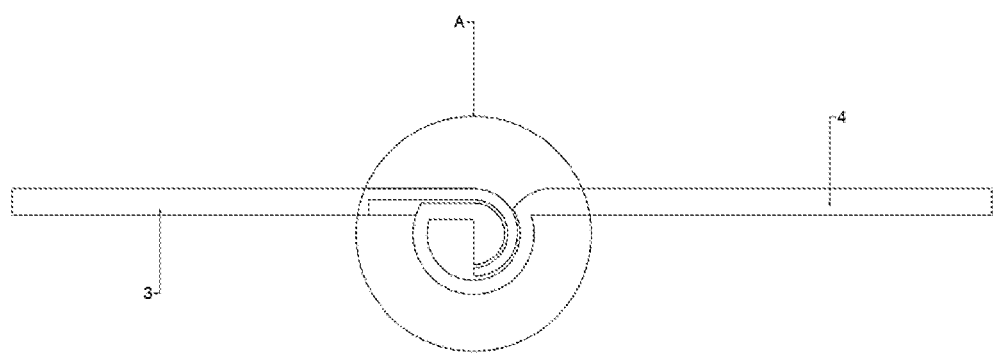
FIG. 4 is a schematic diagram illustrating the cross-sectional structure of the joint between the first upper cover and the second upper cover according to an embodiment of the present disclosure.
Figure 5:
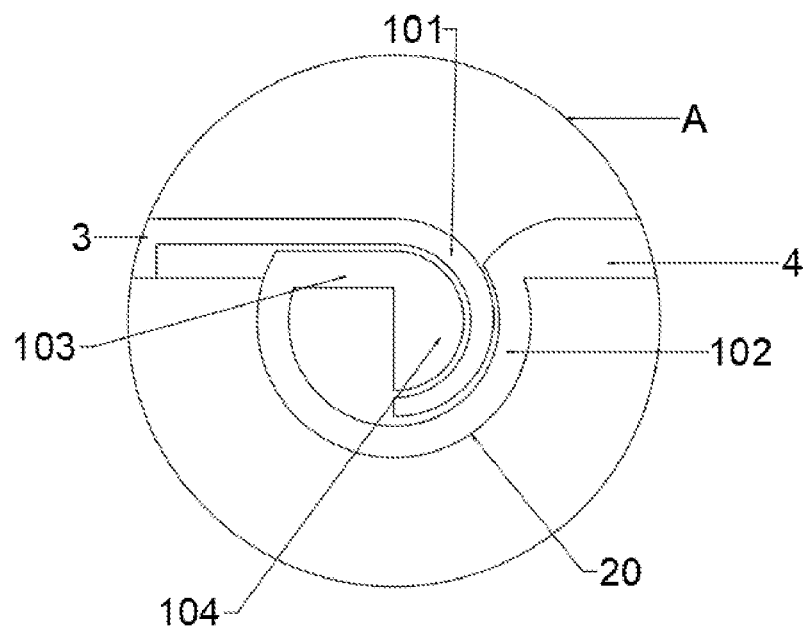
FIG. 5 is a schematic diagram illustrating the structure at portion A shown in FIG. 4.

Referring to FIGS. 1 to 7. In this embodiment, there is provided an LED power supply integrated junction box is provided, which includes a main body 1 and a bottom cover 2.

A plurality of positioning hollow columns 12 are fixedly connected to one side of the inner wall of the main body 1. A partition 17 is fixedly connected to the middle of the main body 1. Two small circular through holes 14 are defined in one side of the partition 17. The opposite surfaces of the partition 17 and the inner wall of the main body 1 are each fixedly connected with a plurality of clamping grooves 16, and a baffle 13 is slidably fitted between every two adjacent clamping grooves 16. The upper side of the main body 1 is fixedly connected with a first upper cover 3.

One side of the first upper cover 3 is installed with a second upper cover 4. The upper side of each of the first upper cover 3 and the second upper cover 4 is provided with a plurality of third screw mounting holes 6. One side of the second upper cover 4 is fixedly connected with a positioning frame 20, and one side of the first upper cover 3 is provided with a first arc-shaped plate 101 adapted to the positioning frame 20, and the first arc-shaped plate 101 is slidably fitted inside the positioning frame 20. One side of the bottom cover 2 is provided with a plurality of first screw mounting holes 11 and a plurality of second screw mounting holes 5.

The peripheral sides of the main body 1 are provided with a plurality of first large circular hollow slots 8, the upper side of the bottom cover 2 is provided with a second large circular hollow slot 10, and the joint between the first upper cover 3 and the second upper cover 4 is a sealed semicircular recessed groove 9.

One aspect of the applications of this embodiment is as follows. When installation of wiring and tubes is needed, any one of the hollow slots can be knocked open and the wire tubes can be fixed. Then when it is needed to fix the junction box, the baffle 13 may first be inserted into the rod body 16, where the roller 103 inside the rod body 16 may facilitate the removal or installation of the baffle 13 thus making it more convenient to take out or install the baffle 13. Then screws may be used to fix the bottom cover 2 to the lower side of the main body 1, and fix the first upper cover 3 and the second upper cover 4 to the upper side of the main body 1. When the internal parts need to be replaced, first the second upper cover 4 may be pushed to move along the positioning frame 20 to the side away from the main body 1, exposing the internal space of the main body 1. Then, when the second upper cover 4 needs to be removed, the second upper cover 4 may first be pulled to make the first arc-shaped plate 101 slide out of the positioning frame 20, and then separate it to complete the removal of the second upper cover 4.

Through the circular groove 9 provided, in the event that water hits the upper cover, the water can be drained through the semi-circular groove 9 without entering the inside of the junction box. When water rushes towards the power supply box from the upper or lower cover, the water will enter the closed screw positioning hollow columns 12 inside the main body 1 through the screw mounting holes, and then drain from the screw mounting holes in the upper or lower cover thus achieving waterproof effect. Furthermore, through a movable baffle 13 arranged inside the main body, the sizes of the input and output wiring spaces can be freely changed, which solves the problem of narrow wiring space and improves the practicability of the junction box. In addition, through a positioning frame 20 provided, the positioning frame 20 makes the first upper cover 3 and the second upper cover 4 a movable hinge structure design, making the junction box more flexible and free and convenient for wiring. Further, by arranging two small circular through holes in the main body, control devices can be installed to realize man-machine interaction, thereby improving the applicability of the junction box.

In this embodiment, partition 17 divides the main body 1 into two independent spaces, including an LED power supply installation space and a wiring space, and the clamping grooves 16 are located in the wiring space.

In this embodiment, a suitable control device is installed in the two small circular through holes 14 for human-computer interaction.

In this embodiment, the first large circular hollow slots 8 and the second large circular hollow 10 are used for the installation of input and output wire tubes. Depending on the specific situation on the site, any of the hollow slots may be knocked open to fix the wire tubes.

In this embodiment, the positioning frame 20 includes a second arc-shaped plate 102, where the upper side of the second arc-shaped plate 102 is fixedly connected with a positioning plate 103, and the lower side of the positioning plate 103 is fixedly connected with an arc-shaped hook 104.

In this embodiment, the first arc-shaped plate 101 is rotatably fitted inside the second arc-shaped plate.

In this embodiment, one side of the main body 1 is provided with a slide groove adapted to the second arc-shaped plate 102, and the second arc-shaped plate 102 is slidably fitted inside the slide groove.

In this embodiment, the first upper cover 3 and the second upper cover 4 each have a rectangular plate structure.

In this embodiment, one side of the positioning hollow column 12 is provided with a threaded groove adapted to the screw.

In this embodiment, one side of the first upper cover 3 is provided with a groove adapted to the positioning plate 103.

The above embodiments can be combined with one another.

It should be noted that the terms "first" and "second" used in the specification, claims and the above-mentioned drawings of this application are intended to distinguish similar objects, and are not necessarily used to describe a specific sequence or order. It should be understood that the data used in this way can be interchanged under appropriate circumstances so that the embodiments of the present application described herein can be implemented in a sequence other than those illustrated or described herein.

As used herein, the orientational or positional relationships indicated by orientational or positional terms such as "front", "back", "up", "down", "left", "right", "lateral", "vertical", "perpendicular", "horizontal", "top", and "bottom", etc. are based on those illustrated in the accompanying drawings, which is merely intended for the convenience of describing the present disclosure and simplifying the description. Unless specified otherwise, these orientational or positional terms do not indicate or imply that the device or element referred to must have a specific orientation or be constructed and operate in a specific orientation, and therefore cannot be understood as a limitation on the scope of protection of the present disclosure; orientation terms "inside" and "outside" refer to the inside and outside relative to the contour of each component itself.

What is claimed is:

1. An LED power supply integrated junction box, comprising a main body and a bottom cover;
    wherein one side of an inner wall of the main body is fixedly connected with a plurality of positioning hollow columns; a partition is fixedly connected to a middle of the main body; two small circular through holes are defined in one side of the partition; opposite surfaces of the partition and the inner wall of the main body are each fixedly connected with a plurality of clamping grooves; a baffle is slidably fitted between every two adjacent clamping grooves; and an upper side of the main body is fixedly connected with a first upper cover;
    one side of the first upper cover is installed with a second upper cover; an upper side of each of the first upper cover and the second upper cover is provided with a plurality of third screw mounting holes; one side of the second upper cover is fixedly connected with a positioning frame, and one side of the first upper cover is provided with a first arc-shaped plate adapted to the positioning frame, wherein the first arc-shaped plate is slidably fitted inside the positioning frame; one side of the bottom cover is provided with a plurality of first screw mounting holes and a plurality of second screw mounting holes; and
    wherein peripheral sides of the main body are provided with a plurality of first large circular hollow slots; an upper side of the bottom cover is provided with a second large circular hollow slot, and a joint between the first upper cover and the second upper cover is a sealed semicircular recessed groove.

2. The LED power supply integrated junction box of claim 1, wherein the partition divides the main body into two independent spaces, comprising an LED power supply installation space and a wiring space, and wherein the clamping grooves are located in the wiring space.

3. The LED power supply integrated junction box of claim 1, wherein a suitable control device is installed in the two small circular through holes for human-computer interaction.

4. The LED power supply integrated junction box of claim 3, wherein the first large circular hollow slots and the second large circular hollow are configured for installation of input and output wire tubes, and wherein depending on specific situation on a site, one of the hollow slots is operative to be knocked open to fix the wire tubes.

5. The LED power supply integrated junction box of claim 4, wherein the positioning frame comprises a second arc-shaped plate, wherein an upper side of the second arc-shaped plate is fixedly connected with a positioning plate, and a lower side of the positioning plate is fixedly connected with an arc-shaped hook.

6. The LED power supply integrated junction box of claim 5, wherein the first arc-shaped plate is rotatably fitted inside the second arc-shaped plate.

7. The LED power supply integrated junction box of claim 6, wherein one side of the main body is provided with a slide groove adapted to the second arc-shaped plate, and the second arc-shaped plate is slidably fitted inside the slide groove.

8. The LED power supply integrated junction box, of claim 7, wherein the first upper cover and the second upper cover are rectangular plate structures.

9. The LED power supply integrated junction box of claim 8, wherein one side of the positioning hollow column is provided with a threaded groove adapted to the screw.

10. The LED power supply integrated junction box of claim 9, wherein one side of the first upper cover is provided with a groove adapted to the positioning plate.

\* \* \* \* \*